United States Patent
Sudbrink et al.

(10) Patent No.: US 9,706,699 B2
(45) Date of Patent: *Jul. 18, 2017

(54) DRAFT LINKAGE CONFIGURATION

(71) Applicant: CNH Industrial America LLC, New Holland, PA (US)

(72) Inventors: Matthew R. Sudbrink, Metamora, IL (US); Dean A. Knobloch, Tucson, AZ (US)

(73) Assignee: CNH Industrial America LLC, New Holland, PA (US)

( * ) Notice: Subject to any disclaimer, the term of this patent is extended or adjusted under 35 U.S.C. 154(b) by 267 days.

This patent is subject to a terminal disclaimer.

(21) Appl. No.: 14/528,236

(22) Filed: Oct. 30, 2014

(65) Prior Publication Data
US 2015/0156956 A1 Jun. 11, 2015

Related U.S. Application Data

(60) Provisional application No. 61/914,594, filed on Dec. 11, 2013.

(51) Int. Cl.
*A01B 73/06* (2006.01)
*A01B 73/02* (2006.01)
(Continued)

(52) U.S. Cl.
CPC ............ *A01B 73/02* (2013.01); *A01B 59/002* (2013.01); *A01B 73/044* (2013.01); *A01B 73/048* (2013.01); *A01B 73/065* (2013.01)

(58) Field of Classification Search
CPC ......... A01B 73/00; A01B 73/02; A01B 73/04; A01B 73/044; A01B 73/046
See application file for complete search history.

(56) References Cited

U.S. PATENT DOCUMENTS 2,713,296 A 7/1955 Silver et al.
2,755,722 A 7/1956 Fraga
(Continued)

FOREIGN PATENT DOCUMENTS

GB 1 269 041 3/1972
GB 1 500 179 2/1978

OTHER PUBLICATIONS

Eastman Industries Limited, Levelling, Stabilizer Arms, Draw Bar, Eye End, Turn Buckle, taken from http://www.eastmanfarmparts.com/levelling-stabilizer-arms-draw-bar1.html, May 6, 2013 (1 page).

*Primary Examiner* — Matthew D Troutman
(74) *Attorney, Agent, or Firm* — Rebecca L. Henkel; Rickard K. DeMille

(57) ABSTRACT

An agricultural tillage implement including a main frame section having a pull hitch tube extending in a travel direction, which may be a telescoping pull hitch tube, a plurality of pivotally coupled wing sections coupled with the main frame section, and a plurality of pivoting wing front shank frames. Draft linkage assemblies connect the plurality of pivotally coupled wing sections to the telescoping pull hitch tube, while allowing both the pivoting wing front shank frames and the plurality of pivotally coupled wing sections to articulate correctly. The main shank frame, the pivotal wing front shank frames, and the wing sections articulate from an operating configuration to a transport configuration.

18 Claims, 8 Drawing Sheets

(51) Int. Cl.
*A01B 59/00* (2006.01)
*A01B 73/04* (2006.01)

(56) References Cited

U.S. PATENT DOCUMENTS

| | | | |
|---|---|---|---|
| 4,211,287 A * | 7/1980 | Garrison | A01B 73/067 |
| | | | 172/311 |
| 4,223,743 A * | 9/1980 | Garrison | A01B 73/02 |
| | | | 172/311 |
| 4,265,464 A | 5/1981 | Lange | |
| 4,492,272 A | 1/1985 | Jensen | |
| 4,564,073 A | 1/1986 | Ide et al. | |
| 4,703,810 A | 11/1987 | Meiners | |
| 4,778,194 A | 10/1988 | Koch et al. | |
| 5,462,123 A | 10/1995 | Harlan et al. | |
| 5,839,516 A | 11/1998 | Arnold et al. | |
| 6,131,669 A * | 10/2000 | Friggstad | A01B 63/32 |
| | | | 172/311 |
| 6,192,994 B1 * | 2/2001 | Friggstad | A01B 63/32 |
| | | | 172/311 |
| 6,202,756 B1 * | 3/2001 | Hundeby | A01B 63/32 |
| | | | 172/311 |
| 6,205,937 B1 * | 3/2001 | Shoup | A01B 73/00 |
| | | | 111/54 |
| 6,293,352 B1 * | 9/2001 | Hundeby | A01B 63/32 |
| | | | 111/54 |
| 6,443,474 B1 | 9/2002 | Kay | |
| 6,550,543 B1 | 4/2003 | Friggstad | |
| 6,557,646 B1 | 5/2003 | Hurtis et al. | |
| 6,609,575 B1 | 8/2003 | Crabb | |
| 6,612,381 B2 | 9/2003 | Powell et al. | |
| 6,681,868 B2 | 1/2004 | Kovach et al. | |
| 6,708,775 B2 | 3/2004 | Beaujot | |
| 7,048,071 B1 | 5/2006 | Huenink et al. | |
| 8,020,629 B1 | 9/2011 | McFarlane et al. | |
| 8,047,299 B2 | 11/2011 | Hurtis et al. | |
| 8,235,133 B2 | 8/2012 | Friggstad | |
| 8,235,410 B2 | 8/2012 | Weber et al. | |
| 8,336,639 B2 | 12/2012 | Palen | |
| 2003/0150626 A1 | 8/2003 | Domries | |
| 2013/0068489 A1 | 3/2013 | Blunier et al. | |
| 2015/0150185 A1 * | 6/2015 | Houck | A01B 59/042 |
| | | | 172/388 |

* cited by examiner

DRAFT LINKAGE CONFIGURATION

CROSS REFERENCE TO RELATED APPLICATIONS

This is a non-provisional application based upon U.S. provisional patent application Ser. No. 61/914,594 entitled "TURNBUCKLE ADJUSTMENT FOR TILLAGE IMPLEMENT TRACKING", filed Dec. 11, 2013, which is incorporated herein by reference.

BACKGROUND OF THE INVENTION

1. Field of the Invention

The present invention relates to agricultural tillage implements, and, more particularly, to agricultural field cultivators.

2. Description of the Related Art

Farmers utilize a wide variety of agricultural tillage implements to prepare soil for planting. Some such implements include two or more sections coupled together to perform multiple functions as they are pulled through fields by a tractor. For example, a field cultivator is capable of simultaneously tilling soil and leveling the tilled soil in preparation for planting. A field cultivator has a frame that carries a number of cultivator shanks with shovels at their lower ends for tilling the soil. The field cultivator converts compacted soil into a level seedbed with a consistent depth for providing excellent conditions for planting of a crop. Grass or residual crop material disposed on top of the soil is also worked into the seedbed so that it does not interfere with a seeding implement subsequently passing through the seedbed.

A field cultivator as described above may also include an optional rear auxiliary implement for finishing the seedbed for seeding. For example, a rear auxiliary implement may include a spike tooth harrow, spring tooth harrow, rolling (aka. crumbler) basket, etc., or any combination thereof.

As agricultural tillage implements become wider and wider over time, it becomes more difficult to keep the transport size of the implement within manageable limits. It also becomes more difficult to convert the agricultural tillage implement from an operating configuration to a transport configuration, or vice versa, without requiring too much time and difficulty on the part of the operator. It is desirable for the agricultural tillage implement to be converted from one mode to the other while the operator remains within the operator cab, through the use of hydraulics or other actuators. It is also desirable for the agricultural tillage implement to remain within certain geometric constraints so that it is not necessary to use a separate "escort vehicle" or the like when traveling on public roads.

SUMMARY OF THE INVENTION

The present invention provides an agricultural tillage implement with wing sections that are foldable to a compact transport configuration.

The invention in one form is directed to an agricultural tillage implement including a main frame section having a pull hitch tube extending in a travel direction and a plurality of pivotally coupled wing sections coupled about generally vertical axes with the main frame section. The plurality of pivotally coupled wing sections can be pivoted forward about the generally vertical axes to a position adjacent to and generally parallel with the pull hitch tube when in the transport configuration, or may be pivoted outward about the generally vertical axes to a position perpendicular to the pull hitch tube when in the operating configuration. Each of the pivotally coupled wing sections has a wing front shank frame pivotally coupled to it, which wing front shank frame may be pivoted to a generally vertical position when in the transport configuration, or may be pivoted to a generally horizontal position when in the operating configuration. Stand-off brackets extend forward from the plurality of pivotally coupled wing sections sufficiently far that they extend forward beyond the space occupied by the wing front shank frames when the wing front shank frames are in their generally vertical positions. Pivoting swing arms are connected to the stand-off brackets, and are able to pivot inwards towards the wing sections, or to pivot forwards towards the forward end of the pull hitch tube. Draft members are coupled to the pivoting swing arms and to the forward end of the pull hitch tube.

The invention in another form is directed to a draft linkage assembly for an agricultural tillage implement. The draft linkage assembly has at least one stand-off bracket attached to a wing section of the agricultural tillage implement, which stand-off bracket extends forward from the wing section beyond the space occupied by a plurality of wing front shank frames which are pivotally attached to the wing section when the wing front shank frames are in generally vertical positions. A pivoting swing arm is connected to the stand-off bracket, and can be pivoted inwards towards the wing section, or pivoted forwards towards the front of the pull hitch tube which makes up part of the main frame of the agricultural tillage implement. A draft member is coupled to the pivoting swing arm and to the forward end of the pull hitch tube.

The invention in yet another form is directed to a hydraulic system for a draft linkage assembly for an agricultural tillage implement. The agricultural tillage implement has a plurality of pivotally coupled wing sections that can be folded forward about the generally vertical axes to a position adjacent to and generally parallel with the pull hitch tube that makes up part of the main frame of the agricultural tillage implement when in the transport configuration, or may be pivoted outward about the generally vertical axes to a position perpendicular to the pull hitch tube when in the operating configuration. The plurality of pivotally coupled wing sections are actuated by main fold hydraulic cylinders. The agricultural tillage implement further has a plurality of wing front shank frames pivotally attached to the front of the wing sections and actuated by wing front shank frame hydraulic cylinders to pivot between generally vertical positions when in the transport configuration and generally horizontal positions when in the operating configuration. The draft linkage assembly has pivoting swing arms connected to stand-off brackets that extend forward of the wing sections, and which connect to draft members which also connect to the front of the pull hitch tube. Pivoting swing arm hydraulic cylinders actuate the pivoting swing arms. At least one interlock is provided that prevents pivoting inwards of the pivoting swing arms unless the plurality of wing front shank frames are in their generally vertical positions, and which prevents the forward folding of the pivotally coupled wing sections unless the pivoting swing arms are folded inwards.

An advantage of the present invention is that the agricultural tillage implement may be quickly and efficiently reconfigured from the operating configuration to the transport configuration.

Another advantage is that the transport configuration of the agricultural tillage implement is kept within manageable limits while still allowing for the desired width and functionality of the agricultural tillage implement when in the operating configuration.

Another advantage is that reconfiguring the agricultural tillage implement from operating configuration to transport configuration and vice versa is accomplished without excessive time and difficulty on the part of the operator, and without requiring the operator to exit the operator cab.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates embodiment of the invention, in one form, and such exemplification is not to be construed as limiting the scope of the invention in any manner.

DETAILED DESCRIPTION OF THE INVENTION

Figure 1:
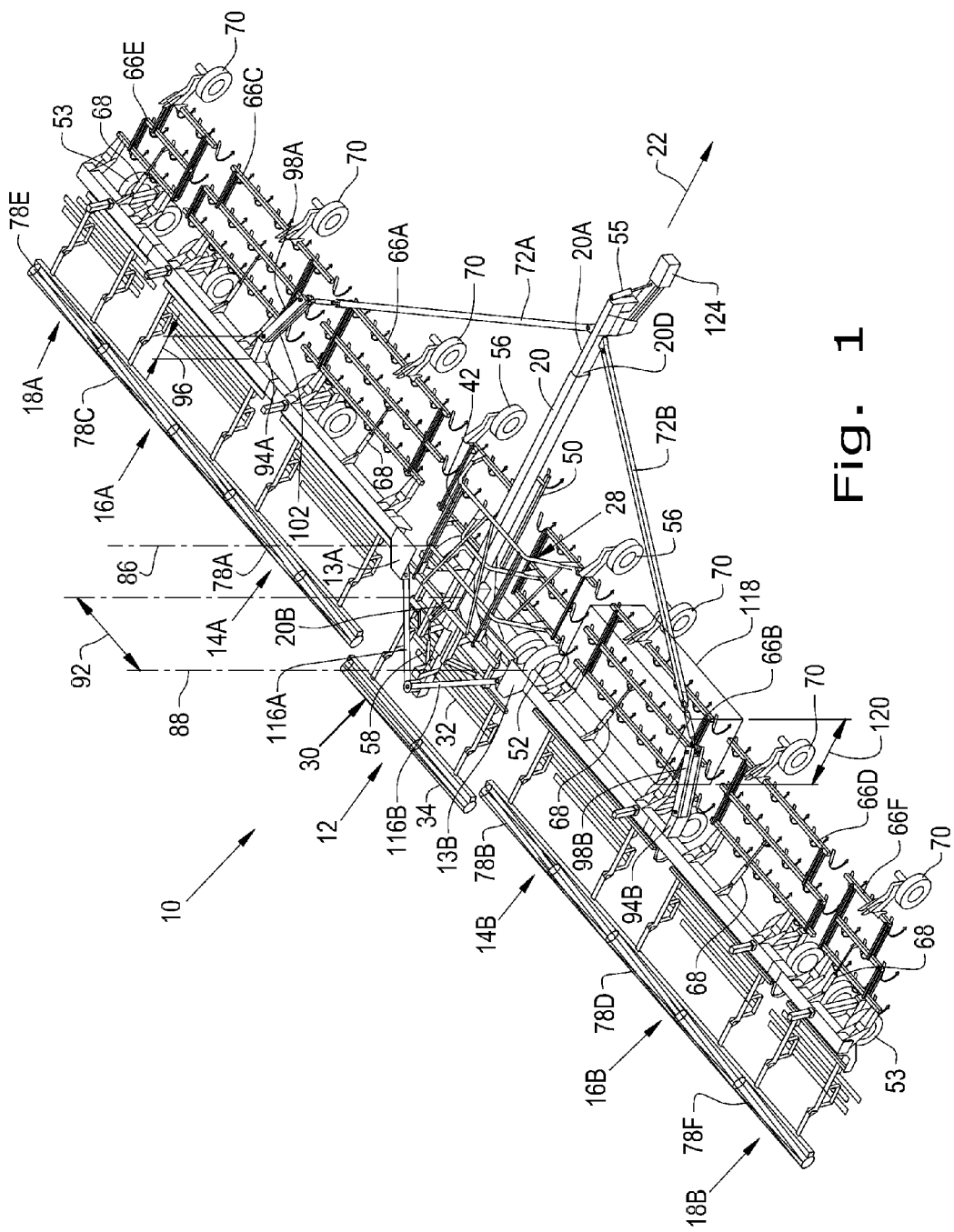
FIG. 1 is a top perspective view of an embodiment of an agricultural tillage implement of the present invention, in the form of a field cultivator.

Referring now to the drawings, and more particularly to FIGS. 1 through 6, there is shown an embodiment of an agricultural tillage implement of the present invention. In the illustrated embodiment, the agricultural tillage implement is in the form of a field cultivator 10 for tilling and finishing soil prior to seeding.

Agricultural tillage implement 10 is configured as a multi-section field cultivator, and includes a main frame section 12 and a plurality of wing sections 14A, 14B, 16A, 16B, 18A and 18B. The left wing sections are designated 14A, 16A, and 18A, and the right wing sections are designated 14B, 16B, and 18B. Wing sections 14A and 14B are each inner wing sections, wing sections 16A and 16B are each middle wing sections, and wing sections 18A and 18B are each outer wing sections. Each wing section 14A, 14B, 16A, 16B, 18A and 18B may be provided with a tool bar segment 24, so that left inner wing section 14A is provided with left inner tool bar segment 24A, right inner wing section 14B is provided with right inner tool bar segment 24B, left middle wing section 16A is provided with left middle tool bar segment 24C, right middle wing section 16B is provided with right middle tool bar segment 24D, left outer wing section 18A is provided with left outer tool bar segment 24E, and right outer wing section 18B is provided with right outer tool bar segment 24F. Intermediate wings 13A and 13B may be attached to main frame section 12, and may provide generally vertical axes 86 and 88 about which the plurality of segmented wing sections 14A, 14B, 16A, 16B, 18A and 18B pivot.

Main frame section 12 is the center section that is directly towed by a traction unit, such as an agricultural tractor (not shown). Main frame section 12 includes a pull hitch tube 20, which may be a telescoping pull hitch tube 20, including a forward end 20A and a rearward end 20B, extending in a travel direction 22, and a tool bar 24 which is coupled with and extends transverse to pull hitch tube 20. Reinforcing gusset plates 26 may be used to strengthen the connection between pull hitch tube 20 and tool bar 24. Main frame section 12 generally functions to carry a main shank frame 28 for tilling the soil, and a main rear auxiliary implement 30 for finishing the soil. Main rear auxiliary implement 30 includes a spring tooth drag 32 and a rolling (aka, crumbler) basket 34 which coact with each other to finish the soil. However, main rear auxiliary implement 30 can be differently configured, such as a spike tooth drag, cultivator shanks, etc.

Figure 4:
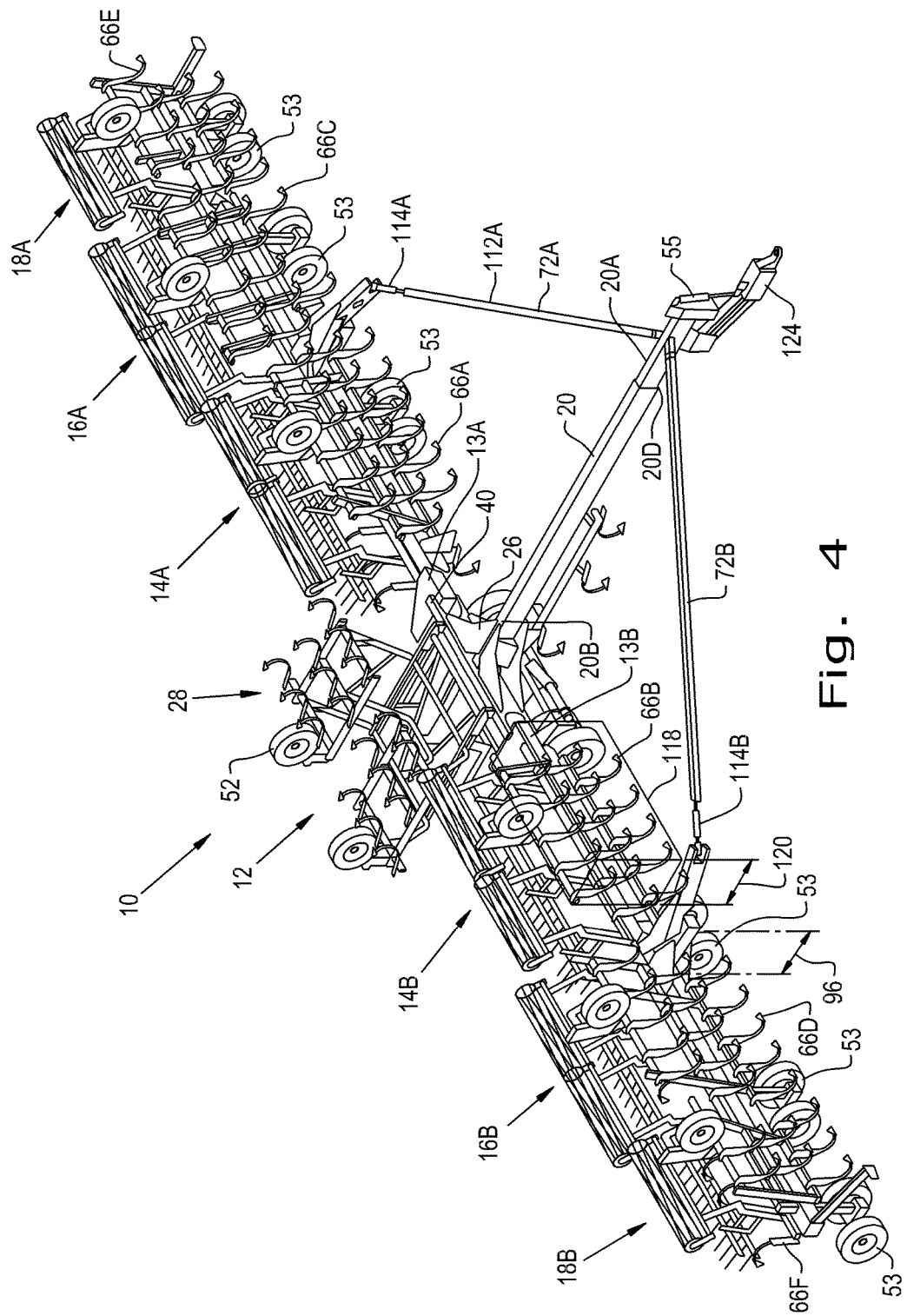
FIG. 4 is a top perspective view of the agricultural tillage implement shown in FIGS. 1-3, with the main shank frame folded rearward to a transport configuration and the wing front shank frames and wing section rear auxiliary implements folded upwards to a transport configuration.

Main shank frame 28 generally functions to carry cultivator shanks 36 with shovels 38 at their lower ends for tilling the soil. Main shank frame 28 is pivotally coupled with tool bar 24, preferably at the top of tool bar 24, such as with couplings 40. Main shank frame 28 is positioned in front of the tool bar 24 when in an operating configuration (FIGS. 1 and 3), and is foldable up and over the tool bar 24 to a position rearward of tool bar 24 when in a transport configuration (FIGS. 2 and 4). Main shank frame 28 includes two sets of longitudinal frame members 42 which are pivotally coupled with tool bar 24 at one end thereof using couplings 40.

A plurality of cross frame members 44 are coupled with the longitudinal frame members 42. Each of the cross frame members 44 have a pair of opposite outboard ends 46 which extend horizontally past longitudinal frame members 42, then in a downwardly angled direction, whereby the outboard ends 46 are positioned on opposite lateral sides of the pull hitch tube 20 when in an operating configuration. The outboard ends 46 of cross frame members 44 are coupled with a pair of respective main shank sub-frames, including left main shank sub-frame 48A and right main shank sub-frame 48B. Main shank sub-frames 48A and 48B are spaced apart from each other in a direction transverse to pull hitch tube 20 and are positioned on respective opposite lateral sides of pull hitch tube 20 when in an operating configuration.

A center shank sub-frame 50 is attached to and positioned below pull hitch tube 20. Since main shank sub-frames 48A and 48B are spaced apart on either side of pull hitch tube 20, center shank sub-frame 50 functions to till the soil in the intermediate open space between the two main shank sub-frames 48A and 48B. Center shank sub-frame 50 includes a number of cultivator shanks 36 and corresponding shovels 38; three in the illustrated embodiment. Center shank sub-frame 50 may be raised up and down with the raising and lowering of the main frame section 12 using rear lift wheels 52 using hydraulic cylinder 54 and using hydraulic cylinder 55 connected to pull hitch 124. Alternately, center shank sub-frame 50 may be raised or lowered independently of main frame section 12.

Main shank frame 28 also includes one or more gauge wheel assemblies 56 which function to level main shank sub-frames 48A and 48B. In the illustrated embodiment, main shank frame 28 includes two gauge wheel assemblies 56 which are respectively coupled with a front of a respective main shank sub-frame 48A or 48B. A main shank frame hydraulic cylinder 58 is used to fold main shank frame 28 from the operating configuration to the transport configuration, and vice versa. Main shank frame hydraulic cylinder 58 may optionally be placed in a "float mode" such that gauge wheel assemblies 56 are operable to float up and down as they traverse across a field and thereby set the operating depth at the front edge of main shank frame 28.

Main shank frame 28 may also include additional support frame members 60 and 62 which provide structural rigidity. Support frame members 60 extend diagonally across the top of main shank frame 28, and support frame members 62 extend diagonally between the outboard ends 46 of cross frame members 44.

During use, it is periodically necessary to move the field cultivator 10 from an unfolded (operating) configuration to a folded (transport) configuration. Rear lift wheel hydraulic cylinder 54 may first be actuated to lift the main frame section 12 to the raised transport configuration using rear lift wheels 52 in cooperation with hydraulic cylinder 55 connected to pull hitch 124. Center shank sub-frame 50 may then be independently moved to a raised position if agricultural tillage implement 10 is provided with an independently movable center shank sub-frame 50. Toolbar lift wheels 53 lift wing sections 14A, 14B, 16A, 16B, 18A and 18B to the raised transport position along with main frame section 12, which toolbar lift wheels 53 are then allowed to caster or pivot. Main shank frame hydraulic cylinder 58 is then actuated to fold main shank frame 28 up and over tool bar 24 to an inverted position rearward of tool bar 24 (FIGS. 2 and 4). Crumbler basket 34 of main rear auxiliary implement 30 may then also be moved to a raised position.

Then left inner wing front shank frame 66A, right inner wing front shank frame 66B, left middle wing front shank frame 66C, right middle wing front shank frame 66D, left outer wing front shank frame 66E, and right outer wing front shank frame 66F of the wing sections 14A, 14B, 16A, 16B, 18A, and 18B are folded upwards to a generally vertical position using wing front shank frame hydraulic cylinders 68 and are locked in the generally vertical position. Wing front shank frames 66A, 66B, 66C, 66D, 66E, and 66F of the wing sections 14A, 14B, 16A, 16B, 18A, and 18B may be folded upwards to the generally vertical position at the same time, or may be folded upwards to the generally vertical position sequentially.

Left inner wing section rear auxiliary implement 78A, right inner wing section rear auxiliary implement 78B, left middle wing section rear auxiliary implement 78C, right middle wing section rear auxiliary implement 78D, left outer wing section rear auxiliary implement 78E, and right outer wing section rear auxiliary implement 78F, each of which may include spring tooth drags, crumbler baskets, spike tooth drags, cultivator shanks, or any combination thereof, may then also be folded upwards to a generally vertical position and are locked in the generally vertical position. Wing section rear auxiliary implements 78A, 78B, 78C, 78D, 78E, and 78F may also be folded upwards to a generally vertical position at the same time, or may be folded upwards to the generally vertical position sequentially. Further, crumbler basket 34 of main rear auxiliary implement 30 may be moved to its raised position at the same time that wing section rear auxiliary implements 78 are folded upwards to their generally vertical positions.

Figure 5:
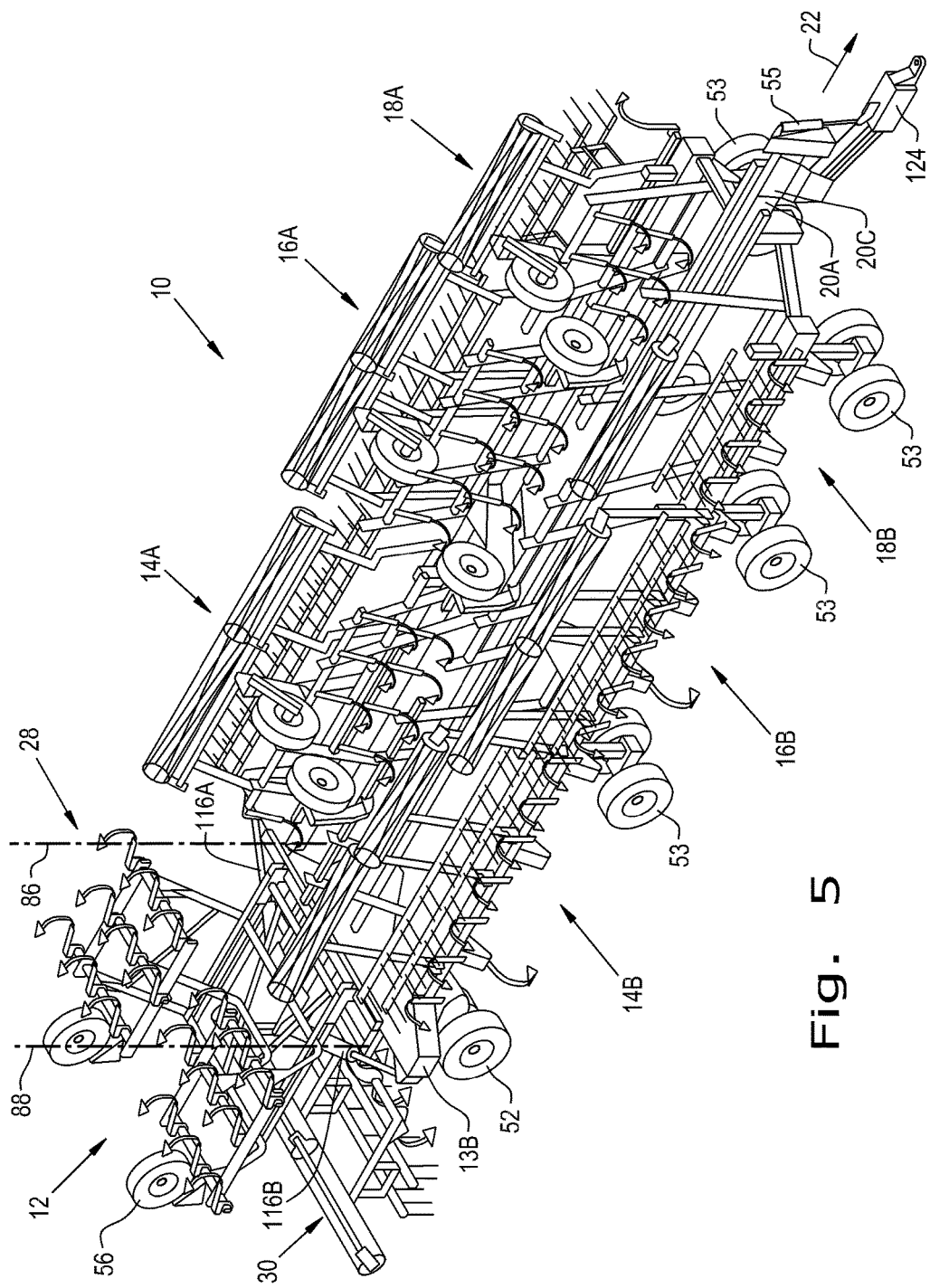
FIG. 5 is a top perspective view of the agricultural tillage implement shown in FIGS. 1-4, with the wing sections folded forward to a transport configuration.
Figure 6:
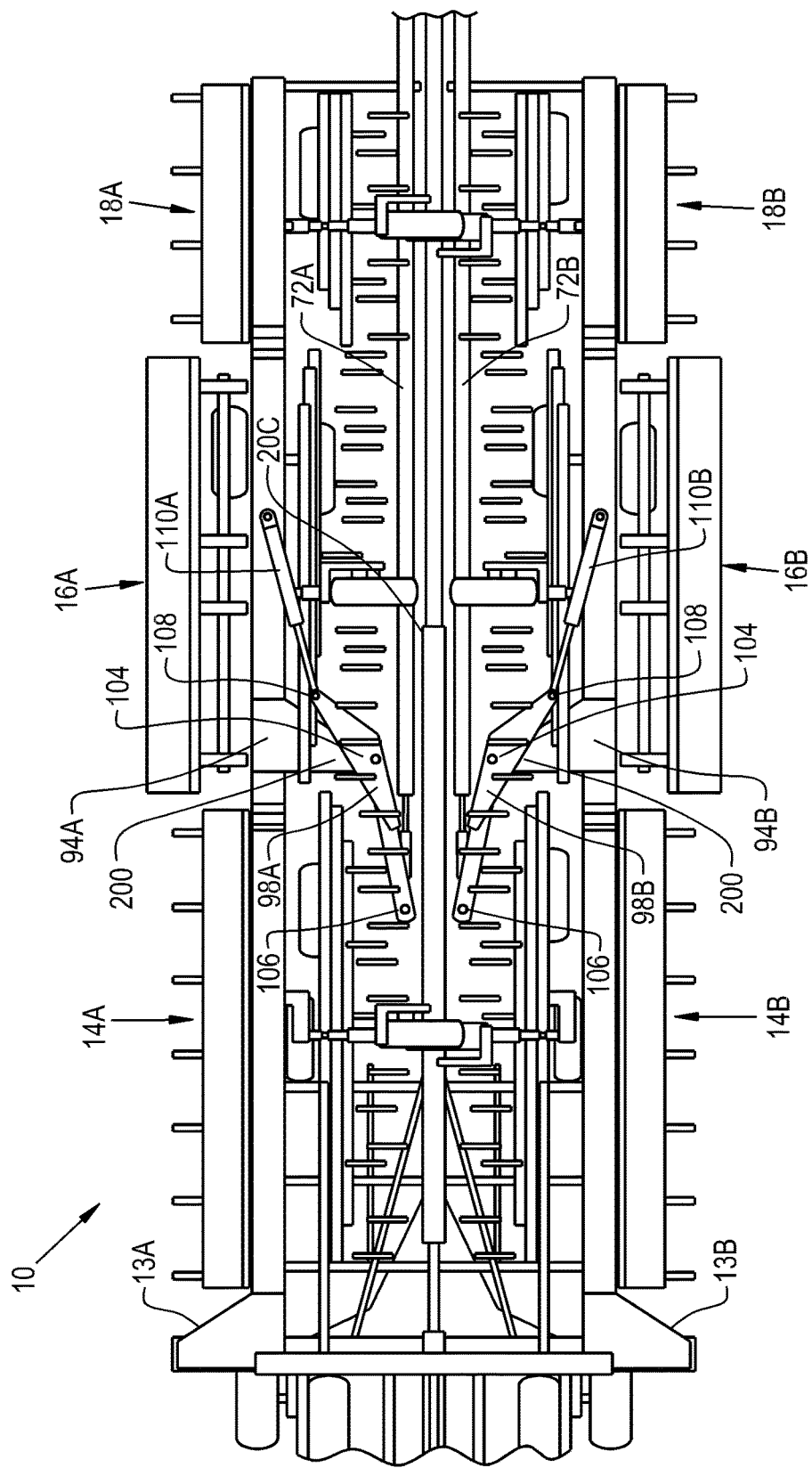
FIG. 6 is a top view of the agricultural tillage implement shown in FIGS. 1-4, with the wing sections folded forward to a transport configuration.

Pivoting swing arms 98A and 98B of draft members 72A and 72B extending between the forward end 20A of pull hitch tube 20 and the pair of middle wing sections 16A and 16B are then folded inward, and wing sections 14A, 14B, 16A, 16B, 18A, and 18B are then folded forward by left main fold hydraulic cylinder 116A and right main fold hydraulic cylinder 116B about generally vertical axes 86 and 88 which pass through intermediate wings 13A and 13B to a position adjacent to and generally parallel with pull hitch tube 20 (FIG. 5). Pull hitch tube 20 may be a telescoping pull hitch tube 20, in which arrangement the draft members 72 extend between the telescoping forward end 20A of the telescoping pull hitch tube 20, which extends 20C as wing sections 14A, 14B, 16A, 16B, 18A, and 18B pivot forward about generally vertical axes 86 and 88, and contracts 20D as wing sections 14A, 14B, 16A, 16B, 18A, and 18B pivot outward about generally vertical axes 86 and 88. Gauge wheel assemblies 56 at the front of main shank frame 28 and gauge wheel assemblies 70 at the front of wing sections 14A, 14B, 16A, 16B, 18A, and 18B are all configured as caster wheels and are not in contact with the ground when field cultivator 10 is in the folded or transport configuration. For unfolding the field cultivator 10 to the operating configuration, the reverse folding sequence is carried out.

Figure 7:
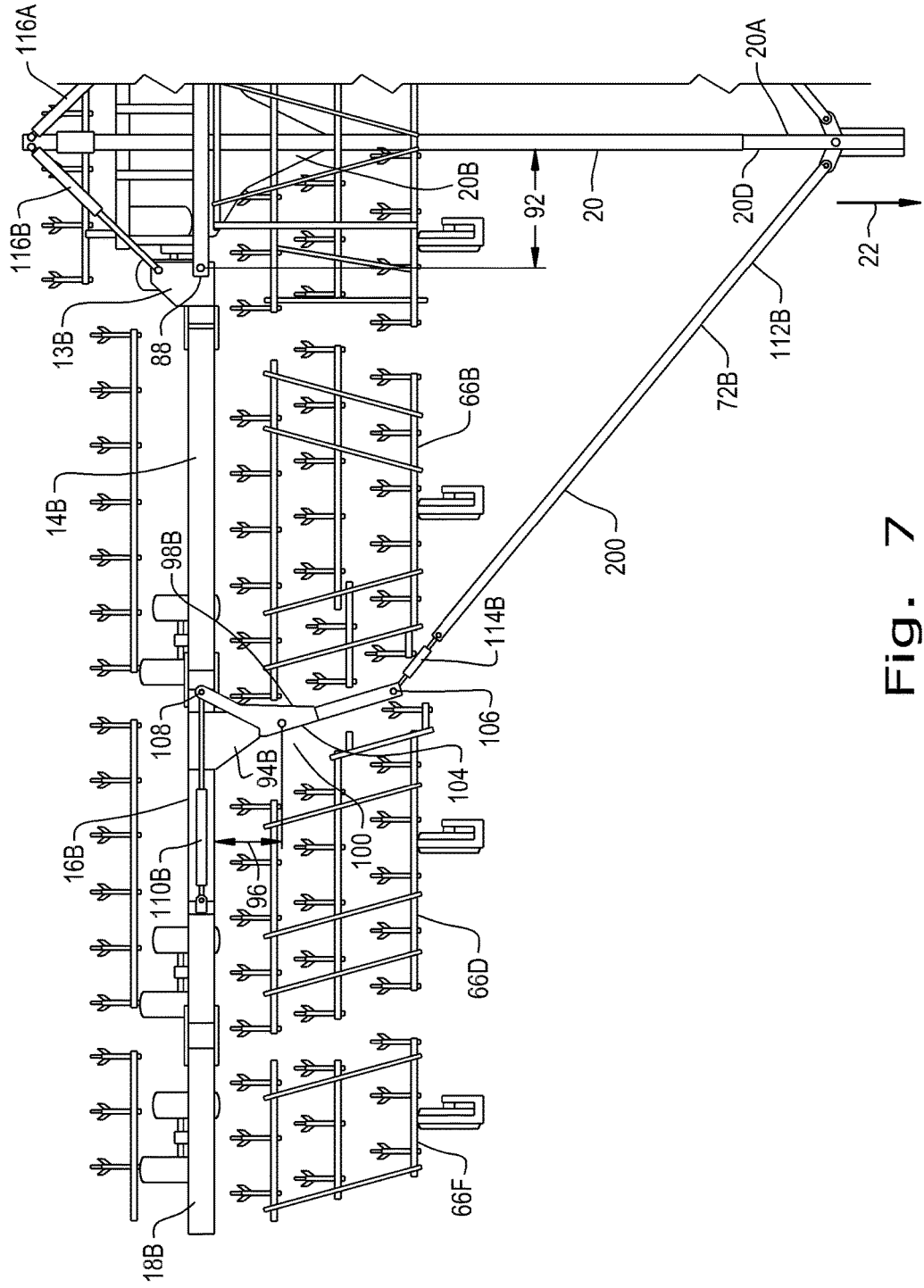
FIG. 7 is a top view of the agricultural tillage implement showing additional detail of the draft linkage assembly.

Looking now to FIG. 7, draft linkage assembly 200, of which right draft member 72B is a part, is shown in more specific detail. A standoff bracket 94, in this embodiment right standoff bracket 94B, extends forward from right middle wing section 16B, though such right standoff bracket 94B could also be attached to right inner wing section 14B or right outer wing section 18B. The distance to which right standoff bracket 94B extends forward of right middle wing section 16B, shown here as reference character 96, is less than the distance shown as reference character 92, which is the lateral distance between the right generally vertical axis 88 about which the wing section 14B, 16B, and 18B pivots and the telescoping pull hitch tube 20 of the main frame section 12. In this way, right standoff bracket 94B, and draft linkage assembly 200 in general, does not interfere with telescoping pull hitch tube 20 of main frame section 12 when right main fold hydraulic cylinder 116B folds wing section 14B, 16B, and 18B into the transport configuration. Note that main fold hydraulic cylinder 116B is shown in a rear mounted configuration, acting on intermediate wing 13B of wing sections 14B, 16B, and 18B directly. It is also contemplated that main fold hydraulic cylinder may be mounted longitudinally on telescoping pull hitch tube 20, causing extending telescoping pull hitch tube 20 to pull wing sections 14B, 16B, and 18B into the transport configuration by action of the draft linkage assembly 200.

Figure 8:
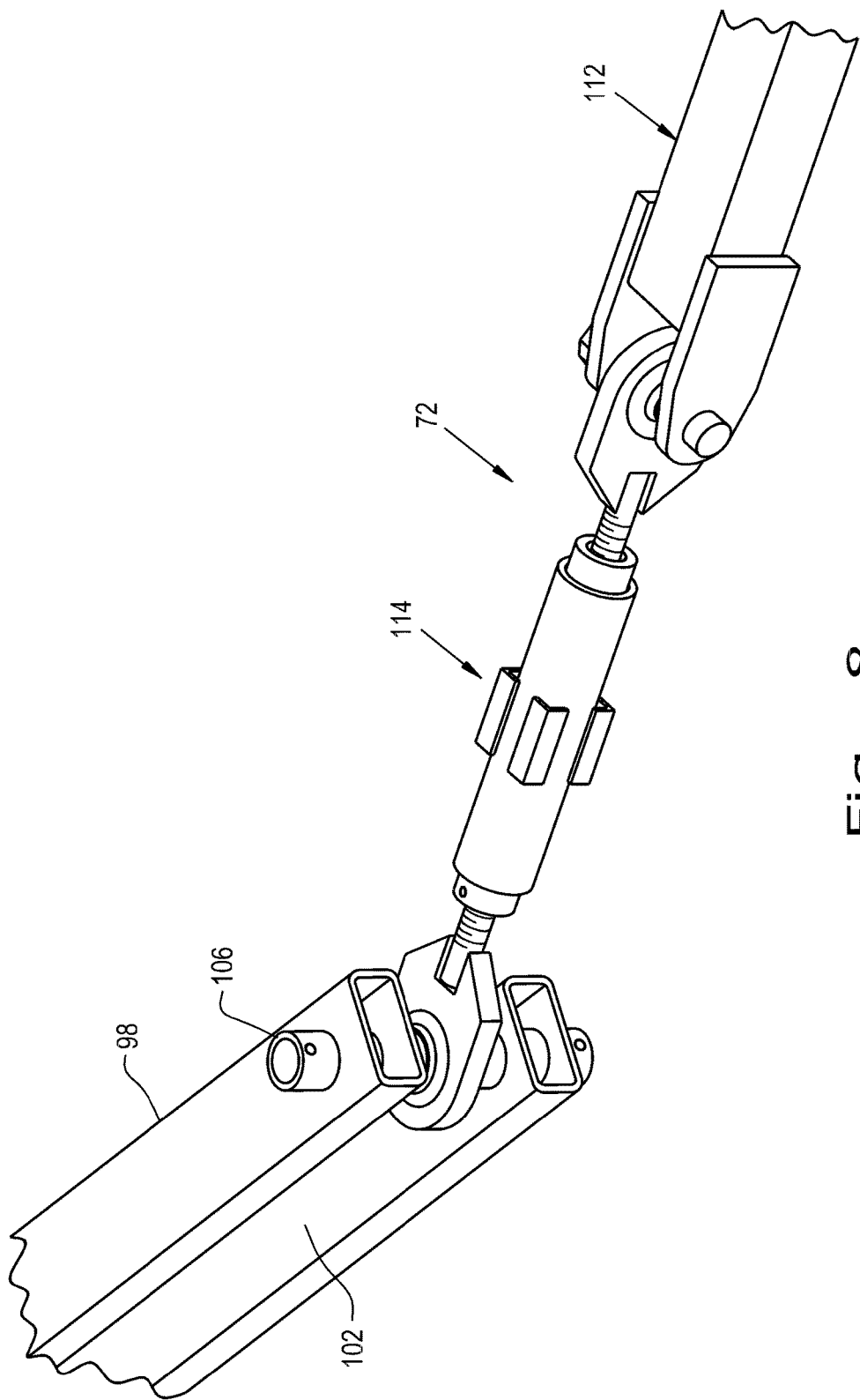
FIG. 8 is a detail view of the draft member.

Draft linkage assembly 200 is further provided with right pivoting swing arm 98B, which is configured as a bell crank arrangement 100. Bell crank arrangement 100 has a pivoting swing arm center pivot 104, which is connected to the right standoff bracket 94B, as well as a pivoting swing arm second pivot 106, which is connected to the right draft member 72B. A pivoting swing arm third pivot 108 is connected to a right pivoting swing arm hydraulic cylinder 110B, which serves to rotate right pivoting swing arm 98B inwards toward right inner wing section 14B upon contraction, and serves to rotate right pivoting swing arm 98B forwards towards pull hitch tube forward end 20A upon extension. Right pivoting swing arm 98B may be provided with a pivoting swing arm recess 102 (see FIGS. 1, 2, and 8), which allows it to nest with right draft member 72B when in the folded configuration, as explained further below.

Note that draft linkage assembly 200 as shown in FIG. 7 has right pivoting swing arm hydraulic cylinder 110B located outwards along right middle wing section 16B from right standoff bracket 94B. An alternate embodiment would place right pivoting swing arm hydraulic cylinder 110B inwards along right middle wing section 16B from right standoff bracket 94B, such that right pivoting swing arm hydraulic cylinder 110B would cause right pivoting swing arm 98B to pivot inwards toward right inner wing section 14B upon extension, and forwards towards pull hitch tube forward end 20A upon contraction.

Figure 2:
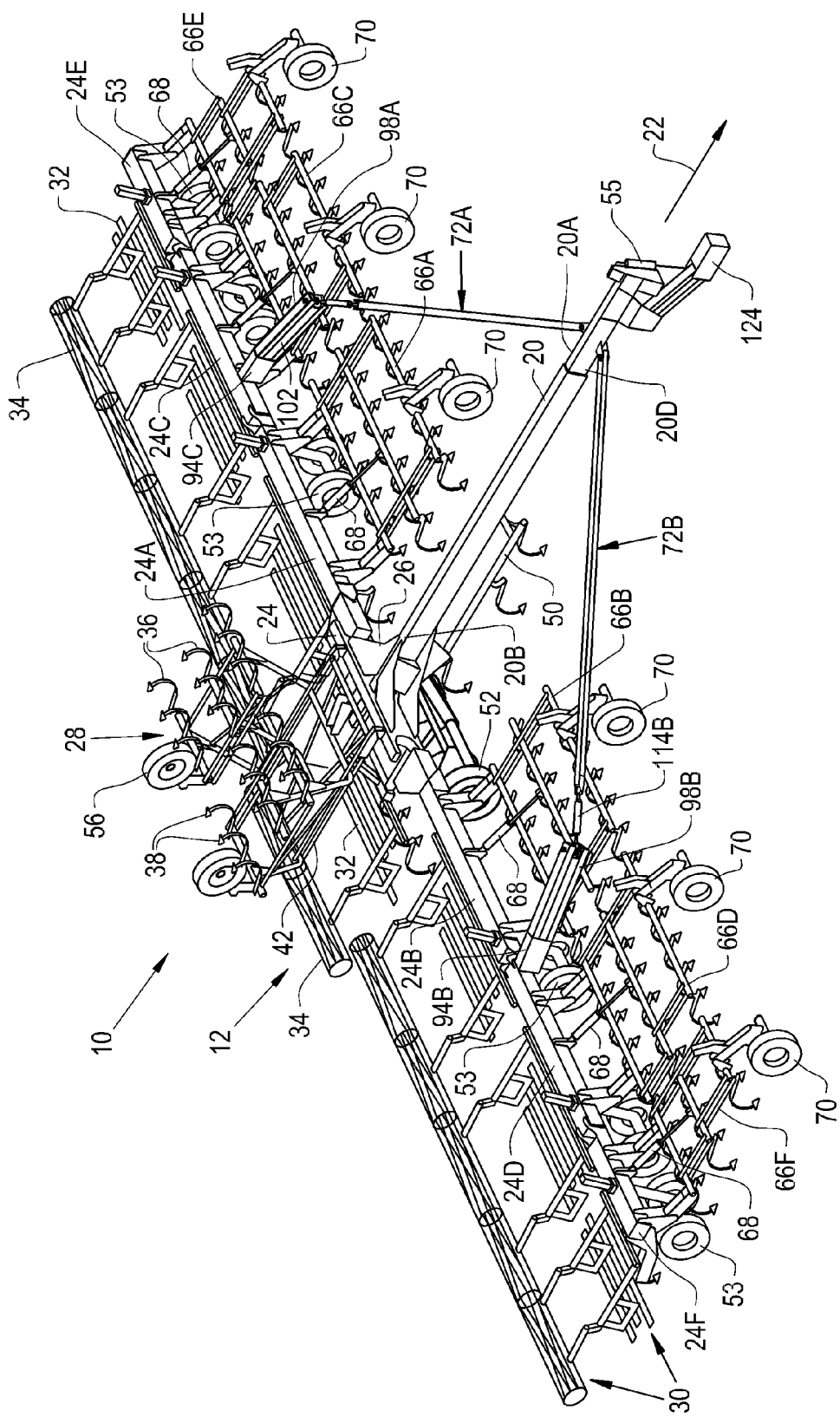
FIG. 2 is the same top perspective view shown in FIG. 1, with the main shank frame folded to a transport configuration.
Figure 3:
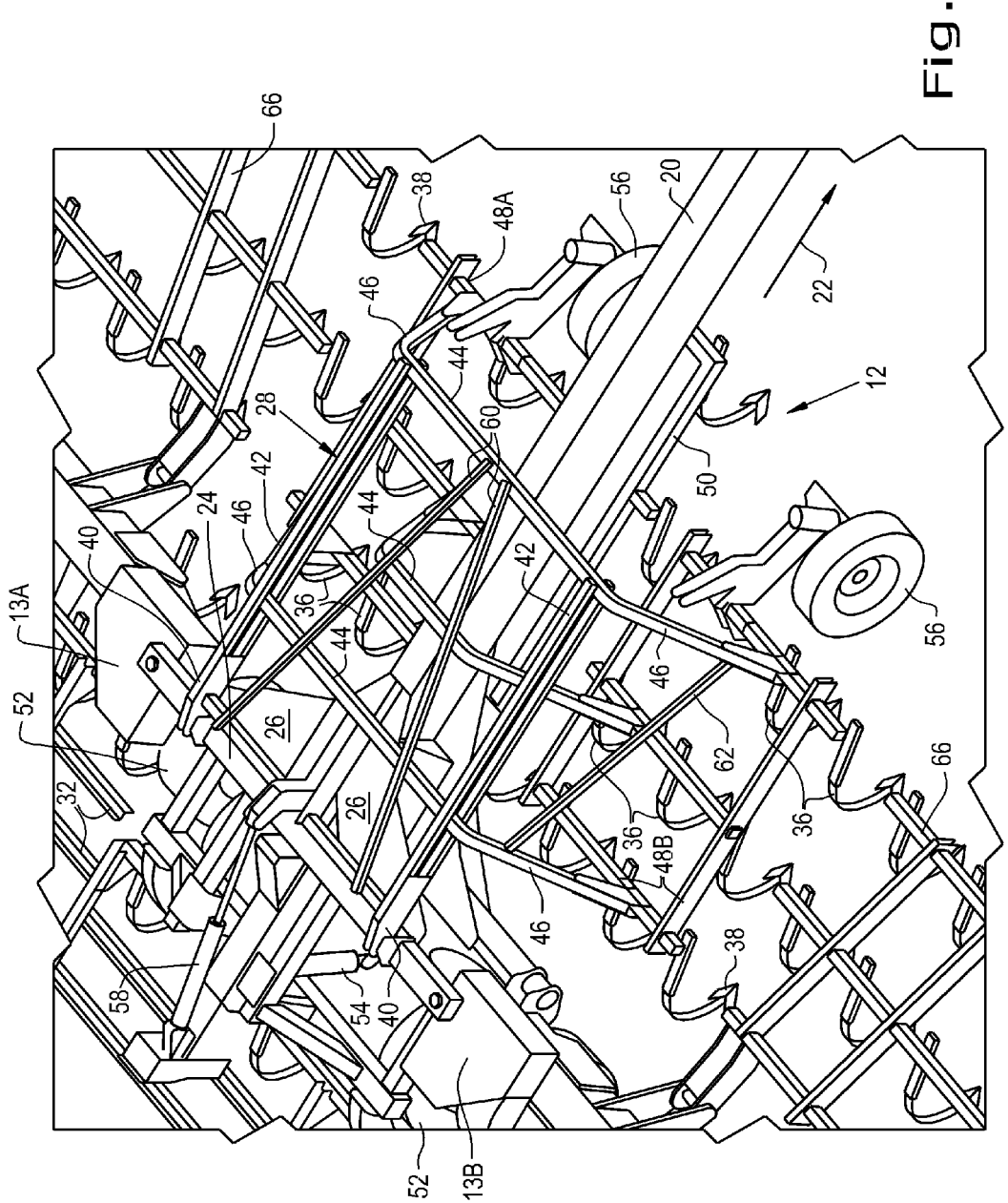
FIG. 3 is a top perspective view of the center frame section with the main shank frame in the operating configuration.

Right standoff bracket 94B extends sufficiently forward from right middle wing section 16B so that when wing front shank frames 66, shown here as right wing front shank frames 66B, 66D, and 66F, are rotated to their generally vertical positions, right standoff bracket 94B extends beyond longitudinal length 120 of the space 118 forward of the wing sections 14B, 16B, and 18B occupied by the wing front shank frames 66A, 66B, 66C, 66D, 66E, and 66F (see FIGS. 1 and 4). In this way, right pivoting swing arm 98B does not interfere with right inner wing front shank frame 66B when right pivoting swing arm 98B pivots inwards towards right inner wing section 14B. Pivoting right pivoting swing arm 98B inwards towards right inner wing section 14B allows wing sections 14B, 16B, and 18B to fold to the transport configuration as right draft member 72B nests with pivoting swing arm recess 102, whereas pivoting right pivoting swing arm 98B forwards towards pull hitch tube forward end 20A allows wing sections 14B, 16B, and 18B to unfold to the operating configuration while still allowing right inner wing shank frame 66B to pivot to the generally horizontal position.

Right draft member 72B may have a right draft tube 112B and a right turnbuckle 114B arranged so that right turnbuckle 114B may be used to adjust the angle of wing sections 14B, 16B, and 18B when in the position perpendicular to the pull hitch tube in the operating configuration, in order to provide for proper tracking of the agricultural tillage implement. It must of course be appreciated that the draft linkage assembly 200 shown in FIG. 7 is shown in a right hand embodiment, and that the agricultural tillage implement may be possessed of a left hand embodiment, including left draft member 72A, left standoff bracket 94A, left pivoting swing arm 98A, left pivoting swing arm hydraulic cylinder 110A, left draft tube 112A, and left turnbuckle 114A, all symmetrically opposite to the draft linkage assembly 200 shown in FIG. 7. Further, the agricultural tillage implement may be possessed of both left and right hand draft linkage assemblies 200.

To prevent improper operation of the agricultural tillage implement, including the sequence of pivoting the plurality of pivotally coupled wing sections 14A, 14B, 16A, 16B, 18A, and 18B forward about the generally vertical axes 86 and 88 to the position adjacent to and generally parallel with the pull hitch tube 20 when changing to the transport configuration or pivoting the plurality of pivotally couple wing sections 14A, 14B, 16A, 16B, 18A, and 18B outward about the generally vertical axes 86 and 88 to the position perpendicular to the pull hitch tube 20 when changing to the operating configuration, pivoting the wing front shank frames 66A, 66B, 66C, 66D, 66E, and 66F to the generally vertical position when changing to the transport configuration or pivoting the wing front shank frames 66A, 66B, 66C, 66D, 66E, and 66F to the generally horizontal position when changing to the operating configuration, or pivoting the pivoting swing arms 98A and 98B inwards towards the wing sections 14A, 14B, 16A, 16B, 18A, and 18B when changing to the transport configuration or pivoting the pivoting swing arms 98A and 98B forwards towards the forward end 20A of the pull hitch tube 20 when changing to the operating configuration, a hydraulic system with at least one interlock may be provided. The at least one interlock prevents pivoting inwards of the pivoting swing arms 98A and 98B unless the plurality of wing front shank frames 66A, 66B, 66C, 66D, 66E, and 66F are in their generally vertical positions, and prevents the forward folding of the pivotally coupled wing sections 14A, 14B, 16A, 16B, 18A, and 18B unless the pivoting swing arms 98A and 98B are folded inwards.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural tillage implement, comprising:
a main frame section including a pull hitch tube extending in a travel direction, said pull hitch tube having a forward end and a rearward end;
at least one wing section pivotally coupled with said main frame section about at least one generally vertical axis located at said rearward end of said pull hitch tube, said at least one generally vertical axis located a first distance laterally outward from said main frame section, said at least one wing section operable to pivot forward about said at least one generally vertical axis to a position adjacent to and generally parallel with said pull hitch tube when in a transport configuration, said at least one wing section operable to pivot outward about said at least one generally vertical axis to a position perpendicular to said pull hitch tube when in an operating configuration;
at least one wing front shank frame pivotally attached to said at least one wing section, said at least one wing front shank frame operable to pivot to a generally vertical position when in said transport configuration and operable to pivot to a generally horizontal position when in said operating configuration, said at least one wing front shank frame occupying a space forward of said at least one wing section when said at least one wing section is in said position perpendicular to said pull hitch tube in said operating configuration, said space forward of said at least one wing section having a longitudinal length that is lesser when said at least one wing front shank frame is in the generally vertical position, and greater when said at least one wing front shank frame is in the generally horizontal position;
at least one stand-off bracket attached to said at least one wing section and extending a second distance perpendicularly from said at least one wing section in a forward direction when said at least one wing section is in said position perpendicular to said pull hitch tube in said operating configuration, and extending perpendicularly from said at least one wing section in a laterally inward direction when said at least one wing section is in said position adjacent to and generally parallel with said pull hitch tube in said transport configuration, said second distance being equal to or greater than said longitudinal length of said space forward of said at least one wing section occupied by said at least one wing front shank frame when in the generally vertical position;

at least one pivoting swing arm being pivotally connected with said at least one stand-off bracket, said at least one pivoting swing arm being operable to pivot inward towards said at least one wing section when in said transport configuration and to pivot forward towards said forward end of said pull hitch tube when in said operating configuration; and at least one draft member being coupled between said at least one pivoting swing arm and said forward end of said pull hitch tube.

2. The agricultural tillage implement of claim 1, wherein: said first laterally outward distance of said generally vertical axis from said main frame section being equal to or greater than said second distance to which said at least one stand-off bracket extends.

3. The agricultural tillage implement of claim 1, wherein: said at least one draft member further comprises at least one draft tube and at least one turnbuckle, said at least one draft tube being pivotally connected to said at least one turnbuckle.

4. The agricultural tillage implement of claim 1, wherein: said at least one pivoting swing arm further comprises a bell crank arrangement, having a center pivot connected with said at least one stand-off bracket, a second pivot connected with said at least one draft member, and a third pivot connected with at least one pivoting swing arm hydraulic cylinder, said at least one pivoting swing arm hydraulic cylinder being further connected to said at least one wing section.

5. The agricultural tillage implement of claim 4, wherein: said at least one pivoting swing arm hydraulic cylinder is connected to said at least one wing section at a location laterally outward from said stand-off bracket along said at least one wing section when said at least one wing section is in said position perpendicular to said pull hitch tube in said operating configuration, said at least one pivoting swing arm hydraulic cylinder being operable to pull said at least one pivoting swing arm third pivot outwards causing said at least one pivoting swing arm to pivot about said center pivot and causing said second pivot connected with said at least one draft member to pivot inwards towards said at least one wing section.

6. The agricultural tillage implement of claim 4, wherein: said at least one pivoting swing arm hydraulic cylinder is connected to said at least one wing section at a location laterally inward from said stand-off bracket along said at least one wing section when said at least one wing section is in said position perpendicular to said pull hitch tube in said operating configuration, said at least one pivoting swing arm hydraulic cylinder being operable to push said at least one pivoting swing arm third pivot outwards causing said at least one pivoting swing arm to pivot about said center pivot and causing said second pivot connected with said at least one draft member to pivot inwards towards said at least one wing section.

7. The agricultural tillage implement of claim 1, wherein: said pull hitch tube further comprises a telescoping pull hitch tube, said telescoping pull hitch tube, said at least one pivoting swing arm, and said at least one draft member cooperating to pivot said at least one wing section forward about said at least one generally vertical axis to said position adjacent to and generally parallel with said telescoping pull hitch tube upon extension of said telescoping pull hitch tube and inward pivoting of said at least one pivoting swing arm in said transport configuration, and said telescoping pull hitch tube, said at least one pivoting swing arm, and said at least one draft member cooperating to pivot said at least one wing section outward about said at least one generally vertical axis to said position perpendicular to said telescoping pull hitch tube upon contraction of said telescoping pull hitch tube and forward pivoting of said at least one pivoting swing arm in said operating configuration.

8. The agricultural tillage implement of claim 7, further comprising:

at least one main fold hydraulic cylinder actuating said at least one wing section to fold forward about said at least one generally vertical axis to said position adjacent to and generally parallel with said telescoping pull hitch tube in cooperation with said telescoping pull hitch tube, said at least one pivoting swing arm, and said at least one draft member when in said transport configuration, said at least one main fold hydraulic cylinder actuating said at least one wing section to fold outward about said at least one generally vertical axis to said position perpendicular to said telescoping pull hitch tube in cooperation with said telescoping pull hitch tube, said at least one pivoting swing arm, and said at least one draft member when in said operating configuration;

at least one pivoting swing arm hydraulic cylinder causing said at least one pivoting swing arm to pivot inward towards said at least one wing section when in said transport configuration and to pivot forward towards said forward end of said pull hitch tube when in said operating configuration;

at least one wing front shank frame hydraulic cylinder causing said at least one wing front shank frame to pivot to said generally vertical position when in said transport configuration and to pivot to said generally horizontal position when in said operating configuration; and at least one interlock between said at least one main fold hydraulic cylinder, said at least one pivoting swing arm hydraulic cylinder, and said at least one wing front shank frame hydraulic cylinder, said at least one interlock disallowing pivoting swing arm hydraulic cylinder from pivoting said pivoting swing arm inward towards said at least one wing section unless said at least one wing front shank frame is in said generally vertical position, said at least one interlock further disallowing said at least one main fold hydraulic cylinder from actuating said at least one wing section to fold forward about said at least one generally vertical axis to said position adjacent to and generally parallel with said telescoping pull hitch tube in cooperation with said telescoping pull hitch tube, said at least one pivoting swing arm, and said at least one draft member unless said pivoting swing arm is pivoted inward towards said at least one wing section.

9. The agricultural tillage implement of claim 1, wherein: said at least one wing section further comprises a left inner wing section, a left middle wing section, a left outer wing section, a right inner wing section, a right middle wing section, and a right outer wing section;

said at least one generally vertical axis further comprises a left generally vertical axis and a right generally vertical axis;

said at least one wing front shank frame further comprises a left inner wing front shank frame, a left middle wing front shank frame, a left outer wing front shank frame, a right inner wing front shank frame, a right middle wing front shank frame, and a right outer wing front shank frame;

said at least one stand-off bracket further comprises a left stand-off bracket and a right stand-off bracket;

said at least one pivoting swing arm further comprises a left pivoting swing arm and a right pivoting swing arm; and said at least one draft member further comprises a left draft member and a right draft member.

10. The agricultural tillage implement of claim 1, wherein:

said at least one pivoting swing arm has at least one recess to allow nesting of said at least one draft member with said at least pivoting swing arm when in said transport configuration.

11. A draft linkage assembly for an agricultural tillage implement which includes a pull hitch tube extending in a travel direction, at least one wing section, and at least one wing front shank frame pivotally attached to the at least one wing section and configured to pivot between a generally vertical position and a generally horizontal position and occupying a space forward of the at least one wing section, the draft linkage assembly comprising:

at least one stand-off bracket attached to at least one wing section and extending perpendicularly from the at least one wing section in a forward direction when the at least one wing section is in a position perpendicular relative to the pull hitch tube in an operating configuration, and extending perpendicularly from the at least one wing section in a laterally inward direction when the at least one wing section is in a position adjacent to and generally parallel with the pull hitch tube in a transport configuration, such that said at least one stand-off bracket extends beyond the space occupied forward of the at least one wing section by the at least one wing front shank frame when the at least one wing front shank frame is in the generally vertical position;

at least one pivoting swing arm pivotally connected with the at least one stand-off bracket, the at least one pivoting swing arm operable to pivot inward towards the at least one wing section when in the transport configuration and to pivot forward towards a forward end of the pull hitch tube when in the operating configuration; and at least one draft member coupled between the at least one pivoting swing arm and the forward end of the pull hitch tube.

12. The draft linkage assembly for an agricultural tillage implement of claim 11, wherein:

the at least one draft member further comprises at least one draft tube and at least one turnbuckle, the at least one draft tube pivotally connected to the at least one turnbuckle.

13. The draft linkage assembly for an agricultural tillage implement of claim 11, wherein:

the at least one pivoting swing arm further comprises a bell crank arrangement having a center pivot connected with the at least one stand-off bracket, a second pivot connected with the at least one draft member, and a third pivot connected with at least one pivoting swing arm hydraulic cylinder, the at least one pivoting swing arm hydraulic cylinder also connected to the at least one wing section.

14. The draft linkage assembly for an agricultural tillage implement of claim 13, wherein:

the at least one pivoting swing arm hydraulic cylinder is connected to the at least one wing section at a location laterally outward from the stand-off bracket along the at least one wing section when the at least one wing section is in the position perpendicular to the pull hitch tube in the operating configuration, the at least one pivoting swing arm hydraulic cylinder operable to pull said at least one pivoting swing arm third pivot outwards causing the at least one pivoting swing arm to pivot about the center pivot and causing the second pivot connected with the at least one draft member to pivot inwards towards the at least one wing section.

15. The draft linkage assembly for an agricultural tillage implement of claim 13, wherein:

the at least one pivoting swing arm hydraulic cylinder is connected to the at least one wing section at a location laterally inward from the stand-off bracket along the at least one wing section when the at least one wing section is in the position perpendicular to the pull hitch tube in the operating configuration, the at least one pivoting swing arm hydraulic cylinder being operable to push the at least one pivoting swing arm third pivot outwards causing the at least one pivoting swing arm to pivot about the center pivot and causing the second pivot connected with the at least one draft member to pivot inwards towards the at least one wing section.

16. The draft linkage assembly for an agricultural tillage implement of claim 13, wherein:

at least one interlock between the at least one main fold hydraulic cylinder, the at least one pivoting swing arm hydraulic cylinder, and the at least one wing front shank frame hydraulic cylinder, the at least one interlock disallowing the at least one pivoting swing arm hydraulic cylinder from pivoting the pivoting swing arm inward towards the at least one wing section unless the at least one wing front shank frame is in the generally vertical position, the at least one interlock further disallowing the at least one main fold hydraulic cylinder from actuating the at least one wing section to fold forward about the at least one generally vertical axis unless the pivoting swing arm is pivoted inward towards the at least one wing section.

17. The draft linkage assembly for an agricultural tillage implement of claim 11, wherein:

the at least one stand-off bracket further comprises a left stand-off bracket and a right stand-off bracket;

the at least one pivoting swing arm further comprises a left pivoting swing arm and a right pivoting swing arm; and the at least one draft member further comprises a left draft member and a right draft member.

18. The draft linkage assembly for an agricultural tillage implement of claim 11, wherein:

the at least one pivoting swing arm has at least one recess to allow nesting of the at least one draft member with the at least pivoting swing arm when in the transport configuration.

* * * * *